United States Patent [19]

Nakakubo et al.

[11] Patent Number: 5,785,619
[45] Date of Patent: Jul. 28, 1998

[54] HYDRAULIC TENSIONER

[75] Inventors: Katsuya Nakakubo; Sumio Watanabe, both of Saitama-ken, Japan

[73] Assignee: Tsubakimoto Chain Co., Osaka-fu, Japan

[21] Appl. No.: 638,242

[22] Filed: Apr. 26, 1996

[30] Foreign Application Priority Data

Apr. 28, 1995 [JP] Japan ................. 7-127367

[51] Int. Cl.$^6$ ............ F16H 7/08; F16H 7/22; F16H 7/12
[52] U.S. Cl. .................. 474/109; 474/110; 474/138
[58] Field of Search ................. 474/101, 109, 474/110, 135, 138; 137/329.3

[56] References Cited

U.S. PATENT DOCUMENTS

| | | | |
|---|---|---|---|
| 4,702,726 | 10/1987 | Ojima et al. | 474/101 |
| 4,772,251 | 9/1988 | Goppelt et al. | 474/101 |
| 4,790,801 | 12/1988 | Schmidt et al. | 474/110 |
| 4,826,470 | 5/1989 | Breon et al. | 474/110 |
| 4,881,927 | 11/1989 | Suzuki | 474/110 |
| 4,909,777 | 3/1990 | Inoue et al. | 474/110 |
| 4,911,679 | 3/1990 | Inoue et al. | 474/110 |
| 4,925,436 | 5/1990 | Hayashi et al. | 474/101 |
| 4,950,209 | 8/1990 | Kawashima et al. | 474/138 |
| 4,963,121 | 10/1990 | Himura et al. | 474/110 |
| 4,976,660 | 12/1990 | Breindl | 474/135 |
| 4,985,009 | 1/1991 | Schmidt et al. | 474/110 |
| 4,986,796 | 1/1991 | Kawashima et al. | 474/101 |
| 4,997,410 | 3/1991 | Polster et al. | 474/110 |
| 4,997,411 | 3/1991 | Breon et al. | 474/110 |
| 5,087,225 | 2/1992 | Futami et al. | 474/91 |
| 5,090,946 | 2/1992 | Futami et al. | 474/104 |
| 5,116,284 | 5/1992 | Cho | 474/110 |
| 5,167,402 | 12/1992 | Nakakubo et al. | 267/226 |
| 5,181,889 | 1/1993 | Maruyama et al. | 474/110 |
| 5,234,383 | 8/1993 | Harada et al. | 474/110 |
| 5,304,099 | 4/1994 | Deppe et al. | 474/110 |
| 5,383,813 | 1/1995 | Odai | 474/110 |
| 5,482,262 | 1/1996 | Hayakawa et al. | 267/226 |
| 5,577,970 | 11/1996 | Smith et al. | 474/110 |
| 5,601,505 | 2/1997 | Tada | 474/110 |
| 5,606,941 | 3/1997 | Trzmiel et al. | 123/90.15 |
| 5,607,368 | 3/1997 | Hida et al. | 474/110 |

FOREIGN PATENT DOCUMENTS 5-38442 5/1993 Japan.
7-6552 1/1995 Japan.

Primary Examiner—Tamara L. Graysay
Assistant Examiner—Gary S. Hartmann
Attorney, Agent, or Firm—Dann, Dorfman, Herrell and Skillman; Henry H. Skillman

[57] ABSTRACT

A hydraulic tensioner 10 includes a piston rod 12 slidably fitted in a cylinder 14 with a small gap or clearance therebetween, and a housing 16 containing the cylinder 14. A ball seat 20 is press-fitted in an end of the cylinder 14 opposite to the piston rod 12 so as to define within the cylinder 14 a high pressure oil chamber 21. The housing 16 has a partition wall 26 at a substantially central portion thereof. The cylinder 14 is loosely fitted in the housing 16 with its longitudinal portion extending forwardly from the partition wall 26. The partition wall 26 has an oil passage 32 having an inside diameter smaller than the outside diameter of the ball seat 20, so that the cylinder 14 and the ball seat 20 are in abutment with the partition wall 26 of the housing 16. A force tending to retract the piston rod 12 generates a pressure which acts on the partition wall 26 either directly via a spring 24 and the cylinder 14 or via the high pressure oil chamber 21 and the ball seat 20.

6 Claims, 5 Drawing Sheets

HYDRAULIC TENSIONER

FIELD OF THE INVENTION

The present invention relates to a hydraulic tensioner used for adjusting a tension on a timing belt, a timing chain or the like (hereinafter referred to as "belt") of an automobile engine.

BACKGROUND OF THE INVENTION

A typical type of hydraulic tensioner includes a hollow housing having at its one end an opening, a circular hollow cylinder disposed in the housing, and a piston rod slidable within the cylinder. In operation, a force tending to extend or advance the piston rod is exerted on the piston rod to keep the tension on a toothed belt or a chain (hereinafter simply referred to as "belt") at a constant value. The piston rod projects from the opening of the housing, and a seal is provided between the housing and the piston rod to close or seal an oil within the housing. The piston rod has secured thereto a rod guide, and a low pressure oil chamber defined within the housing is divided by the rod guide. A spring is disposed in a compressed or preloaded condition between the housing and the rod guide, and exerts a force on the piston rod to urge the piston rod in the advancing direction.

When the belt becomes slack, the piston rod advances whereupon an oil immediately flow from an oil reservoir in fluid communication with the first chamber normally containing low pressure oil into second chamber normally containing a high pressure oil defined within the cylinder so that a proper tension on the belt is immediately recovered. Conversely, when the belt is subjected to undue tension, the high pressure oil in the chamber gradually leaks out through the clearance between the cylinder and the piston rod, causing the piston rod to gradually retract to take up or absorb the undue tension on the belt.

One conventional hydraulic tensioner, as shown here in FIG. 3, includes a piston rod 52 slidably fitted in a cylinder 56 with a clearance therebetween so as to form or define a second chamber 54 within the cylinder 56. The cylinder 56 is received in a housing 58 such that the cylinder 56 and the piston rod 52 are surrounded by a first chamber 60 defined in the housing 58. A check valve 62 is provided at the bottom of the cylinder 56 to limit a flow of oil to a single direction from the first chamber 60 to the chamber 54. Since the check valve 62 is provided at the bottom of the cylinder 56, machining of the surface of a ball seat constituting a part of the check valve is extremely difficult to achieve, thereby failing to provide a sufficient degree of airtightness between a ball and the ball seat. Accordingly, the piston rod is liable to retract due to the leakage of oil from the second, with the result that the tension on the belt cannot be maintained at a constant value.

FIG. 4 illustrates another conventionl hydraulic tensioner 80 having a check valve 70 which is constructed independently from a cylinder 72 and is designed for the purpose of providing a solution for the problem of insufficient airtightness between a ball 74 and a ball seat 76. This arrangement, however, has a different problem that, due to misalignment of the ball seat 76 in the cylinder, wear and galling of the cylinder 72 and a piston 78 as well as radial distortion of the cylinder and the piston 78 is caused, resulting in deteriorated durability of the tensioner.

variant of the structurally independent ball seat design is shown in FIG. 5, in which the ball seat 82 has an outside diameter greater than the inside diameter of a cylinder 84. The ball seat 82 thus constructed is likely to be detached from the cylinder 84 by the oil pressure in the cylinder 84.

SUMMARY OF THE INVENTION

To solve the foregoing problems, the present invention provides a hydraulic tensioner of the type described, wherein the improvement comprises a check valve manufactured structurally independently of the cylinder and having a ball check and a ball seat. The check valve is inserted in a bottom portion of the cylinder, and when assembled, is in abutment with a housing.

With this construction, a force acting in the retracting direction of the piston rod is borne by the ball seat supported by the housing. In addition, since the check valve is structurally independent from the cylinder, machining of a seat surface of the ball seat can be achieved without difficulty and, hence, is able to provide an improved degree of airtightness between a ball and the ball seat, thereby precluding the leakage of oil from the second chamber.

Because the ball seat is structurally independent from the cylinder, it may occur that the pressure acting within the high pressure oil chamber could tend to separate the ball seat and the cylinder. It is, therefore, preferable that the outside diameter of the ball seat be the same as or slimmer than the inside diameter of the cylinder. With this arrangement, the cylinder is not subjected to a force tending to separate the cylinder from the ball seat. Accordingly, even when a high pressure is generated in the second chamber, separation between the ball seat and the cylinder does not take place.

It is further preferable that the cylinder and the piston rod be loosely fitted in the housing rather than being secured by press-fitting engagement between the cylinder and the housing. If the cylinder were secured to the housing as in the conventional hydraulic tensioner, the concentricity between the cylinder and the housing or the concentricity between the piston rod and the housing could be degraded by a working error or manufacturing tolerances. In addition, they may exhibit an error in parallelism. These errors would cause galling or abrasive wear between the cylinder and the piston rod. Another problem is that irregular contact made between the piston rod and a seal brings about the leakage of oil. It is, therefore, preferable that the cylinder be loosely fitted in the housing so that the cylinder is permitted to undertake self-alignment in the radial direction.

DESCRIPTION OF THE PREFERRED EMBODIMENTS

Figure 1:
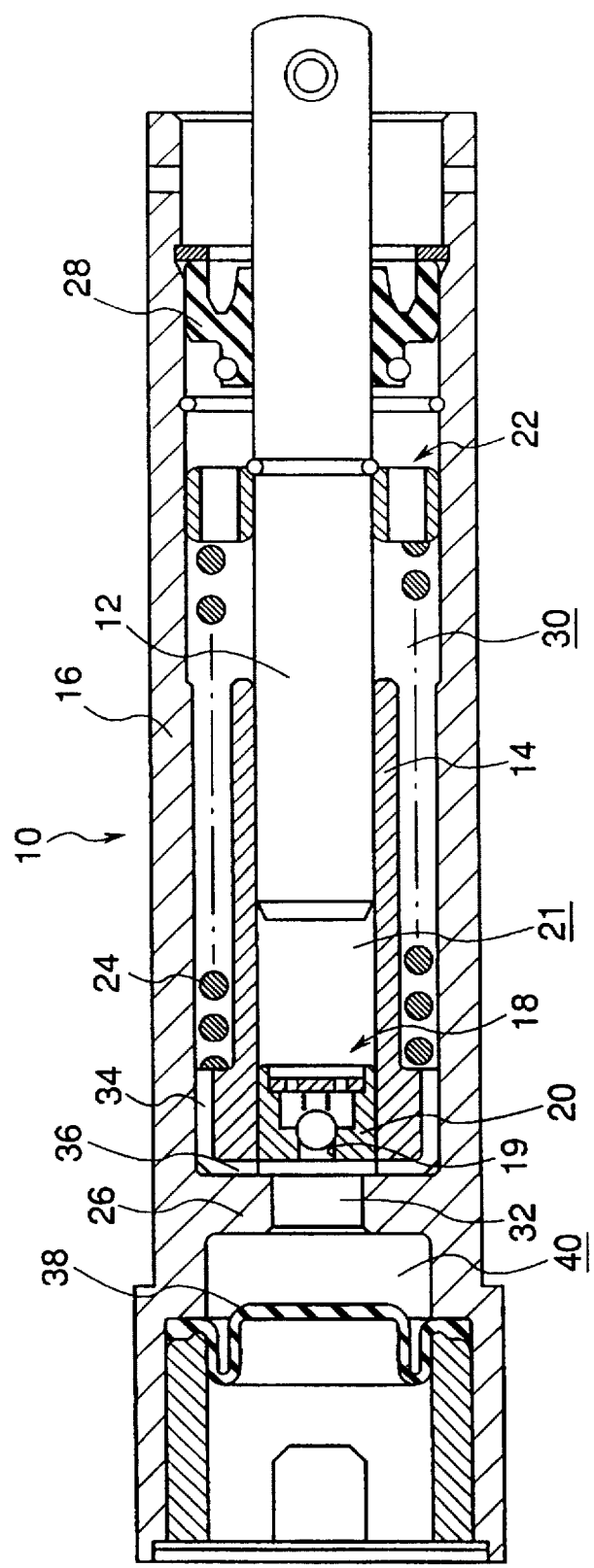
FIG. 1 is a cross-sectional view of an embodiment of a hydraulic tensioner according to the present invention.
Figure 2:
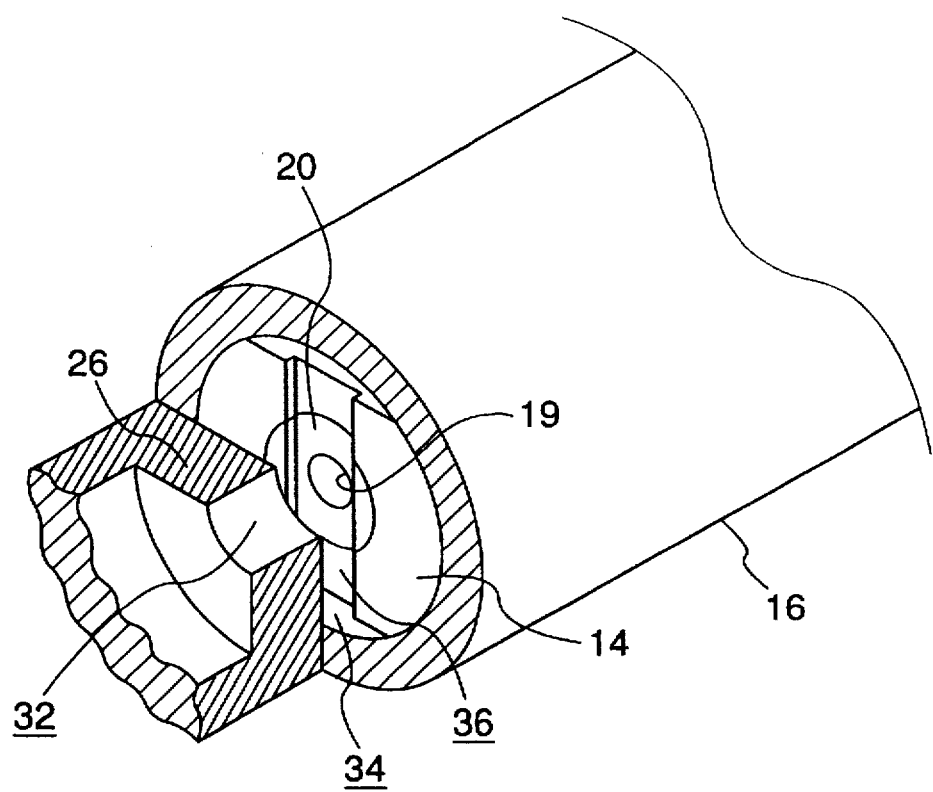
FIG. 2 is a perspective view, with parts broken away for clarity, of the tensioner shown in FIG. 1.

As shown in FIGS. 1 and 2, a hydraulic tensioner 10 according to the present invention includes a piston rod 12 slidably fitted in a cylinder 14 with a small gap or clearance therebetween, and a housing 16 containing the cylinder 14. A first chamber 30 is formed in the housing 16 around the cylinder 14, and may be identified as a housing chamber. A ball seat 20 is press-fitted in the bottom of the cylinder 14 opposite to the piston rod 12 so as to define a second chamber 21 identified as a piston chamber for high pressure oil between the piston 12 and cylinder 14. The ball seat 20 constitutes a part of a check valve 18. The piston rod 12 has attached thereto a rod guide 22 by means of which the piston rod 12 is guided coaxially within the housing 16. A compression spring 24 is disposed between the cylinder 14 and the rod guide 22 in a loaded or compressed condition and urges the piston rod 12 away from the cylinder 14 within the housing 16. When the rod 12 is displaced by the spring, the pressure in the second chamber 21 is reduced, and the ball check 17 operates to permit flow from the chamber 30 to the chamber 21.

Figure 3:
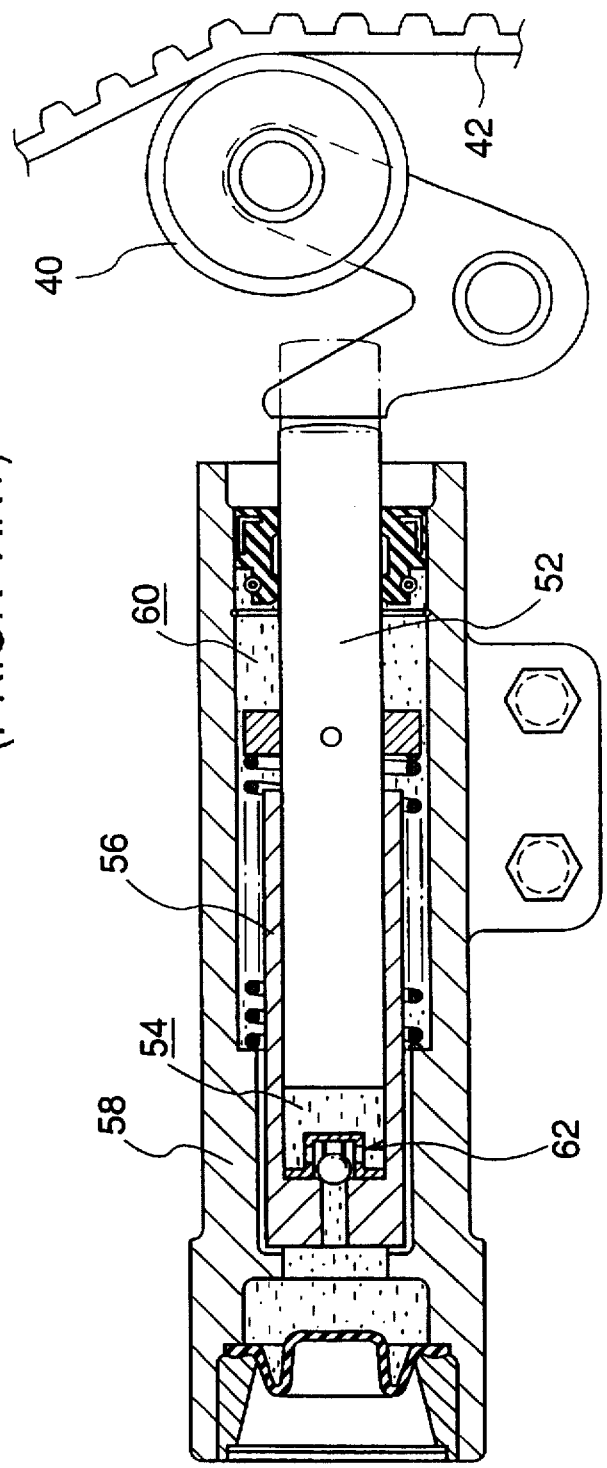
FIG. 3 is a cross-sectional view of a prior art conventional tensioner, showing its relationship with a timing belt during its operation.
Figure 4:
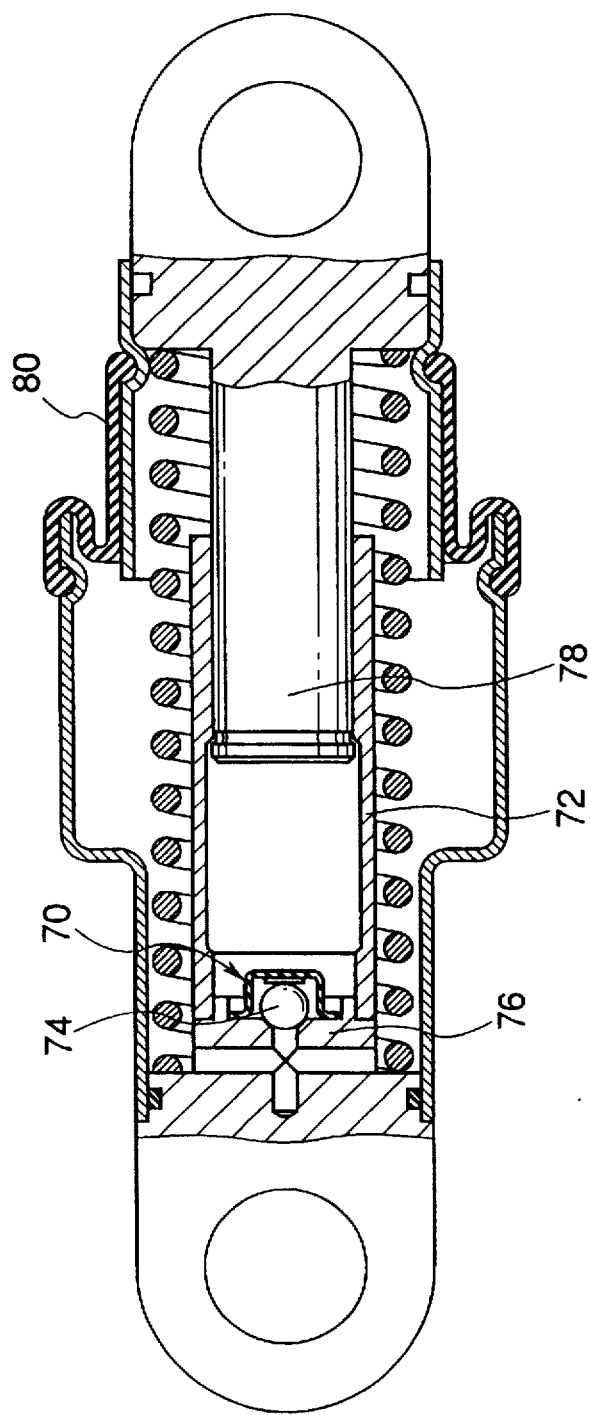
FIG. 4 is a cross-sectional view of another tensioner.

The tensioner 10 may be used in place of the tensioner shown in FIG. 3. That tensioner has a piston rod 52 operable to cause a pulley 40 to bear against the run of a belt 42 between a spaced pair of toothed pulleys (not shown). When the belt 42 becomes slack, the piston rod is advanced by the pressure of the oil in the tensioner to restore a proper tension on the belt. In the present case, the rod 12 slides within the housing 16 which forms a first low-pressures 30 for hydraulic oil. The rod 12 passes through a seal 28 which maintains the seal side portion of the first chamber at a positive pressure (gauge pressure) above the atmospheric pressure surrounding the housing 16.

The housing 16 has a partition wall 26 at a substantially central portion thereof. The cylinder 14 is loosely fitted in a portion of the housing 16 extending forwardly from the partition wall 26 so that the cylinder 14 can be self-aligned with respect to the housing 16 together with the rod guide 22. The piston rod 12 projects outwardly from the housing 16, and the housing 16 has a seal 28 surrounding the piston rod 12. The piston rod 12, the cylinder 14, the housing 16 and the seal 28 jointly define therebetween a space constituting the low pressure oil chamber 30.

The partition wall 26 has at its central portion an oil passage 32. The cylinder 14 has a pair of axial oil passages or grooves 34 circumferentially spaced about its outer perimeter at equal angular intervals of 180 degrees. The oil passages or groove 34 communicate with a diametrical oil passage or groove 36 formed in the bottom of the cylinder 14 and the bottom of the ball seat 20 (See FIG. 2). The housing 16 has a rear portion having formed therein an oil reservoir 40 closed by a diaphragm 38. The diaphragm allows the reservoir to expand and contract to accommodate the displacement of the internal end of the piston rod 12 within the housing. The oil or other hydraulic fluid in the first chamber 30 communicates with the oil reservoir 40 via the oil passages 34, 36 and 32.

The oil passages 34 and 36 shown in FIG. 1 may be replaced by an oil groove formed in the housing 16 for interconnecting the first chamber 30 and the oil passage 32.

The oil passage 32 has an inside diameter smaller than the outside diameter of the ball seat 20, so that the cylinder 14 and the ball seat 20 are held in abutment with the partition wall 26 of the housing 16. A force tending to retract the piston rod 12 acts on the partition wall 26 either via the spring 24 and the cylinder 14 or via the second chamber 21 and the ball seat 20.

The hydraulic tensioner of the present invention is able to achieve various distinguishable efforts described below.

(1) The surface of the ball seat can be machined easily. Since the ball seat is structurally independent from the cylinder, high precision machining of the seat surface is possible, and an improved degree of airtightness can, therefore, be provided between the ball and the ball seat, thereby precluding the leakage of oil from the second chamber.

(2) In the case where the ball seat is disposed in the housing structurally independently from the cylinder, the coaxiality of the cylinder and the piston rod with respect to the housing is generally degraded. However, since the structurally independent ball seat of this invention is press-fitted in the cylinder, and since the cylinder is loosely fitted in the housing, the cylinder is radially displaceable to a slight extent and, hence, can be self-aligning with respect to the housing.

The foregoing loose fit between the cylinder and the housing may be insufficient to secure the self-alignment of the cylinder, and so a further structure permitting the piston rod and the rod guide to be displaced relative to the housing is desirable. If not, the cylinder, the piston rod and the rod guide as a whole cannot achieve self-alignment with respect to the housing. The spring should preferably be disposed in a compressed condition between the cylinder and the rod guide. The spring 24 may be disposed in the first chamber 30 in a loaded or compressed condition. In the case where the spring engages a member which is incapable of being aligned by itself, such as the housing 16, the cylinder 14 moves forward when the piston rod 12 is extended. Accordingly, the spring needs to be guided in such an unself-alignable member.

Figure 5:
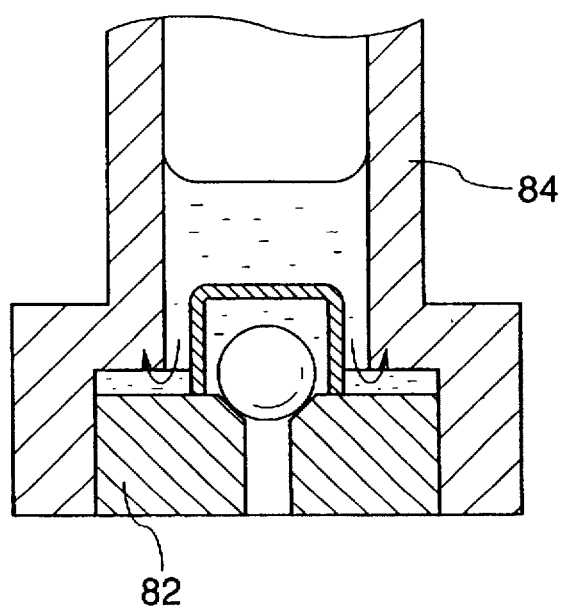
FIG. 5 is a fragmentary cross-sectional view showing a check valve in another conventional tensioner.

(3) Since the outside diameter of the structurally independent ball seat 20 is the same as (or may be smaller than) the inside diameter of the cylinder 14, the ball seat is not subjected to a force tending to separate the ball seat and the cylinder even when the pressure in the high pressure oil chamber 21 increases, as would otherwise be the case (see FIG. 5). Furthermore, the force of the belt on the piston rod 12 tending to retract the piston rod 12 acts via the cylinder 14 against the partition wall 26 of the housing 16. The ball seat 20 comprises a cylindrical plug having an outside diameter corresponding to the bore diameter of the cylinder 14 which slidably receives the interior end of the piston rod 12. This diameter is larger than the diameter of the oil passage 32 which is coaxially aligned with the cylinder 14, whereby the ball seat and the cylinder are both positioned to abut the partition wall, circumscribing the passage 32. Accordingly, the ball seat and the cylinder are not displaceable in position relative to each other when the cylinder 14 is seated against the partition wall 26. The check valve has a port 19 which is axially aligned with the passage 32 and is smaller in diameter than the passage 32.

According to the present invention, since the ball seat 20 is manufactured structurally independent from the cylinder and is inserted in the cylinder, machining of a seat surface of the ball seat can be achieved easily as opposed to the difficult conventional machining which would be required at the bottom of the cylinder. The ball is engageable with the ball seat while maintaining an improved degree of airtightness therebetween with the result that the reverse leakage of oil from the second oil chamber 21 through the check valve port 19 can be voided. Thus, the belt is always kept under constant tension by the tensioner.

Furthermore, since the check valve is held in abutment with a bottom wall 26 of the housing 16, the pressure in the second chamber 21 against the check valve structure is opposed by the housing. Accordingly, the check valve is prevented from becoming displaced from the cylinder.

While a particular embodiment of the present invention has been herein illustrated and described, it is not intended to limit the invention to such disclosures, but changes and modifications may be made therein and thereto within the scope of the following claims.

We claim:

1. A hydraulic tensioner including a hollow cylinder having a cylindrical bore of uniform diameter through its length, a piston rod having an internal end slidably fitted in said cylindrical bore with a clearance therebetween so as to define within said cylinder a piston chamber for oil normally at a given pressure, sliding movement of said piston rod expanding and contracting said piston chamber, a housing containing said cylinder and defining therebetween a housing chamber for oil at a pressure below said given pressure extending around said cylinder and said piston rod, and a check valve provided in said bore beyond said internal end of the piston rod at a bottom portion of said cylinder for permitting flow of oil in a single direction from said housing chamber to said piston chamber when said piston chamber is expanded by sliding movement of said piston rod, characterized in that said check valve is structurally independent from said cylinder and has a ball seat with a cylindrical outer surface conforming to said uniform diameter of said bore and fitted in said bore at said bottom portion of said cylinder, and having an end disposed in abutment with said housing.

2. For use with a belt having a run extending between spaced pulleys, a hydraulic tensioner having a housing, a piston rod extending from one end of said housing having an internal end within said housing and an external end terminating in means to engage said run to maintain a desired tension therein, a seal to close said one end of the housing while affording axial displacement of said rod through said one end, the other end of the housing having a reservoir and a communicating elongated housing chamber for oil at a given pressure, resilient means to bias said rod to advance axially of said housing to urge said engaging means against the belt run, a hollow cylinder having a cylindrical bore of uniform diameter through its length mounted in said housing coaxial with said piston rod, said cylinder bore slidably receiving the internal end of said piston rod to form a piston chamber for oil at a pressure above said given pressure, sliding movement of said piston rod expanding and contracting said piston chamber, said piston chamber having a check valve providing one-way communication from said reservoir and said housing chamber into said piston chamber upon axial displacement of said piston rod with the bias of said resilient means to expand said piston chamber, said slidable engagement between said internal rod end and said cylinder providing a clearance for leakage of oil from said piston chamber through said housing chamber to said reservoir upon axial retraction of said piston rod against the bias of said bias means to contract said piston chamber, whereby oil in said piston chamber reinforces said bias resisting retraction of said piston rod, said check valve comprising a ball seat structurally independent from said cylinder with a cylindrical outer surface conforming to said uniform diameter of said bore and fitted in said bore beyond the internal end of said piston rod, and having a first end disposed in abutment with said housing.

3. A hydraulic tensioner according to claim 2, said internal bore having an inner end slidably receiving said internal rod end, said check valve comprising a cylindrical plug adapted to fit into said internal bore at said inner end of said cylinder bore, the ball seat having a second end which confronts said internal bore, said plug having a port open to said reservoir and including a ball check cooperable with said seat to constitute said check valve.

4. For use with a belt having a run extending between spaced pulleys, a hydraulic tensioner having a housing, a piston rod extending from one end of said housing having an internal end within said housing and an external end terminating in means to engage said run to maintain a desired tension therein, a seal to close said one end of the housing while affording axial displacement of said rod through said one end, the other end of the housing having a reservoir and a elongated housing chamber in free fluid communication therewith for oil at a given pressure, resilient means to bias said rod to advance axially of said housing to urge said engaging means against the belt run, a hollow cylinder mounted in said housing coaxial with said piston rod, said cylinder slidably receiving the internal end of said piston rod to form a piston chamber for oil at pressure above said given pressure, sliding movement of said piston rod expanding and contracting said piston chamber, said piston chamber having a check valve providing one-way communication from said reservoir and said cylinder chamber into said piston chamber upon axial displacement of said piston rod with the bias of said resilient means to expand said piston chamber, said slidable engagement between said internal rod end and said hollow cylinder providing a clearance for leakage of oil from said piston chamber through said housing chamber to said reservoir upon axial retraction of said piston rod against the bias of said bias means to contract said piston chamber, whereby oil in said piston chamber reinforces said bias resisting retraction of said piston rod, said check valve comprising a plug adapted to fit into said piston chamber at the inner end of said cylinder, the ball seat being formed in the part of said plug which confronts said piston chamber and having a port open to said reservoir in the opposite part of said plug which confronts said reservoir, and including a ball check cooperable with said seat to constitute said check valve a ball seat structurally independent from said cylinder, wherein said housing has an end wall between said reservoir and said housing chamber, said end wall having a passage affording said free fluid communication between said housing chamber and said reservoir, said port being axially aligned with said passage and being of smaller diameter than said passage, said plug being of larger diameter than said passage whereby said end wall engages said plug about the circumference of said passage.

5. A hydraulic tensioner according to claim 4 wherein said cylinder has an internal end confronting said housing end wall and is provided with grooves extending from said housing chamber to said reservoir passage.

6. A hydraulic tensioner according to claim 2 wherein said resilient means comprises a compressed coil spring having one end convolution seated against said cylinder and an opposite end convolution at the other end engaging said piston rod, whereby the cylinder is urged against said other end of the housing and said piston rod is urged to advance the engaging means against the belt run.

* * * * *